Figure 1:
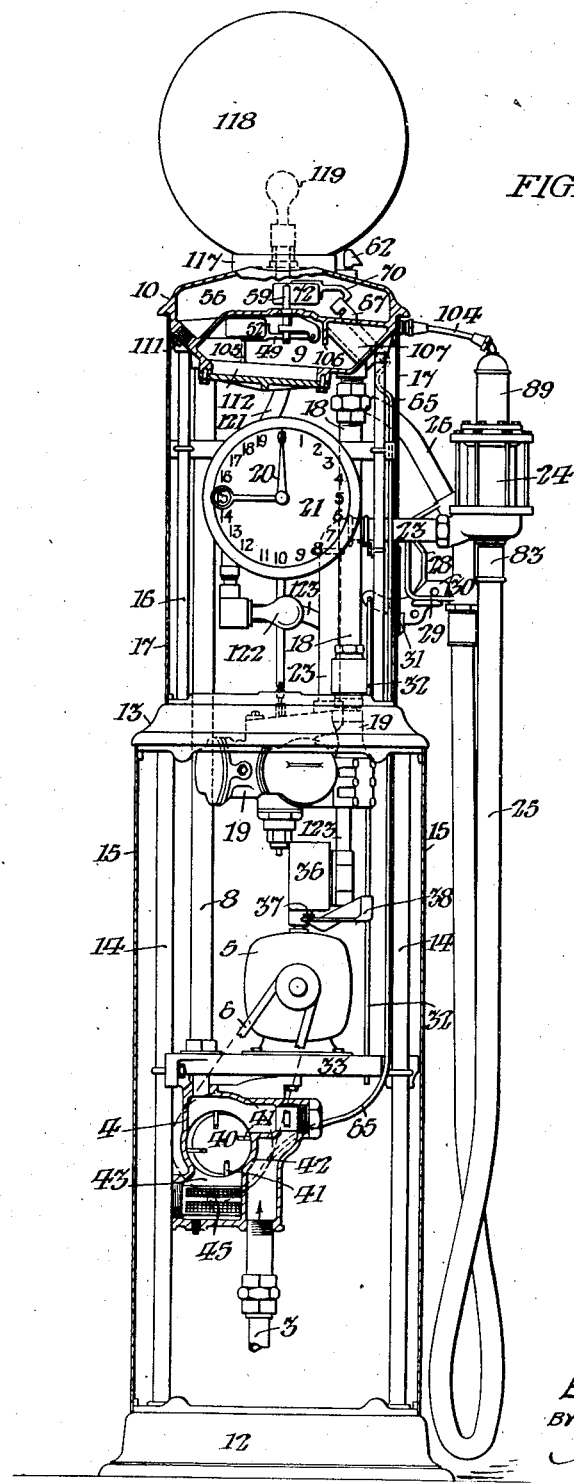

Sept. 27, 1932. E. W. KENT 1,879,308

LIQUID DISPENSING APPARATUS

Filed Dec. 4, 1931 4 Sheets-Sheet 1

INVENTOR:
EARL W. KENT,
BY

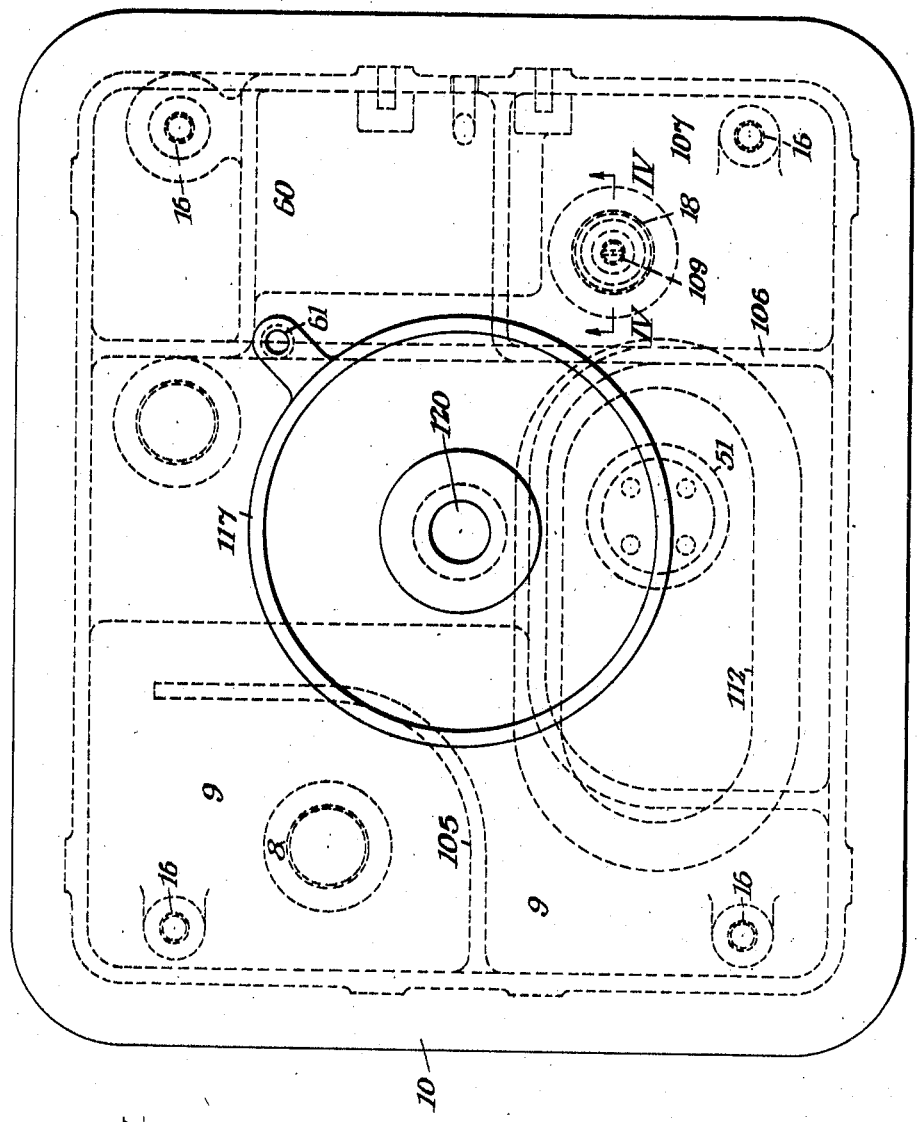

Sept. 27, 1932. E. W. KENT 1,879,308
LIQUID DISPENSING APPARATUS
Filed Dec. 4, 1931 4 Sheets-Sheet 3
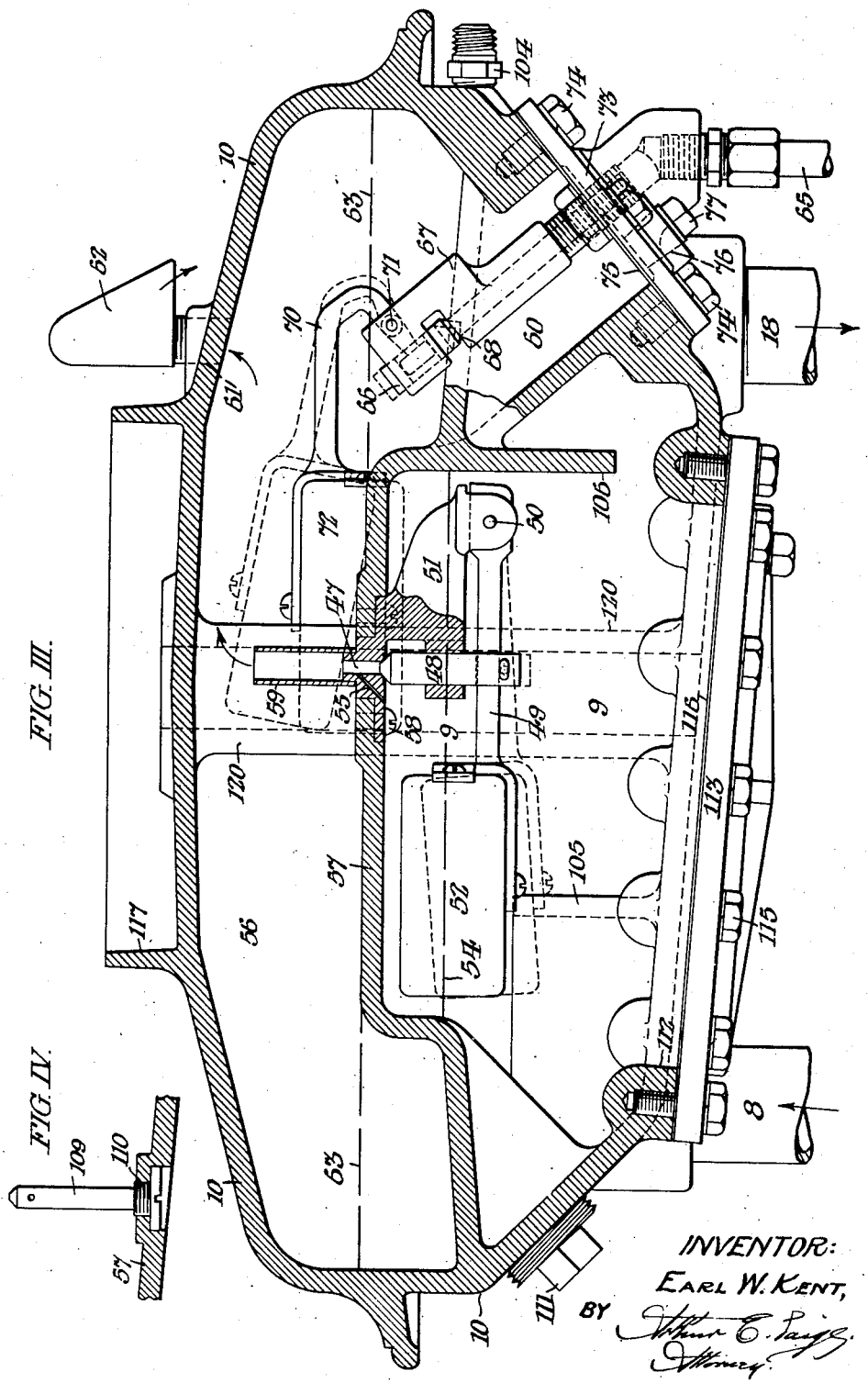

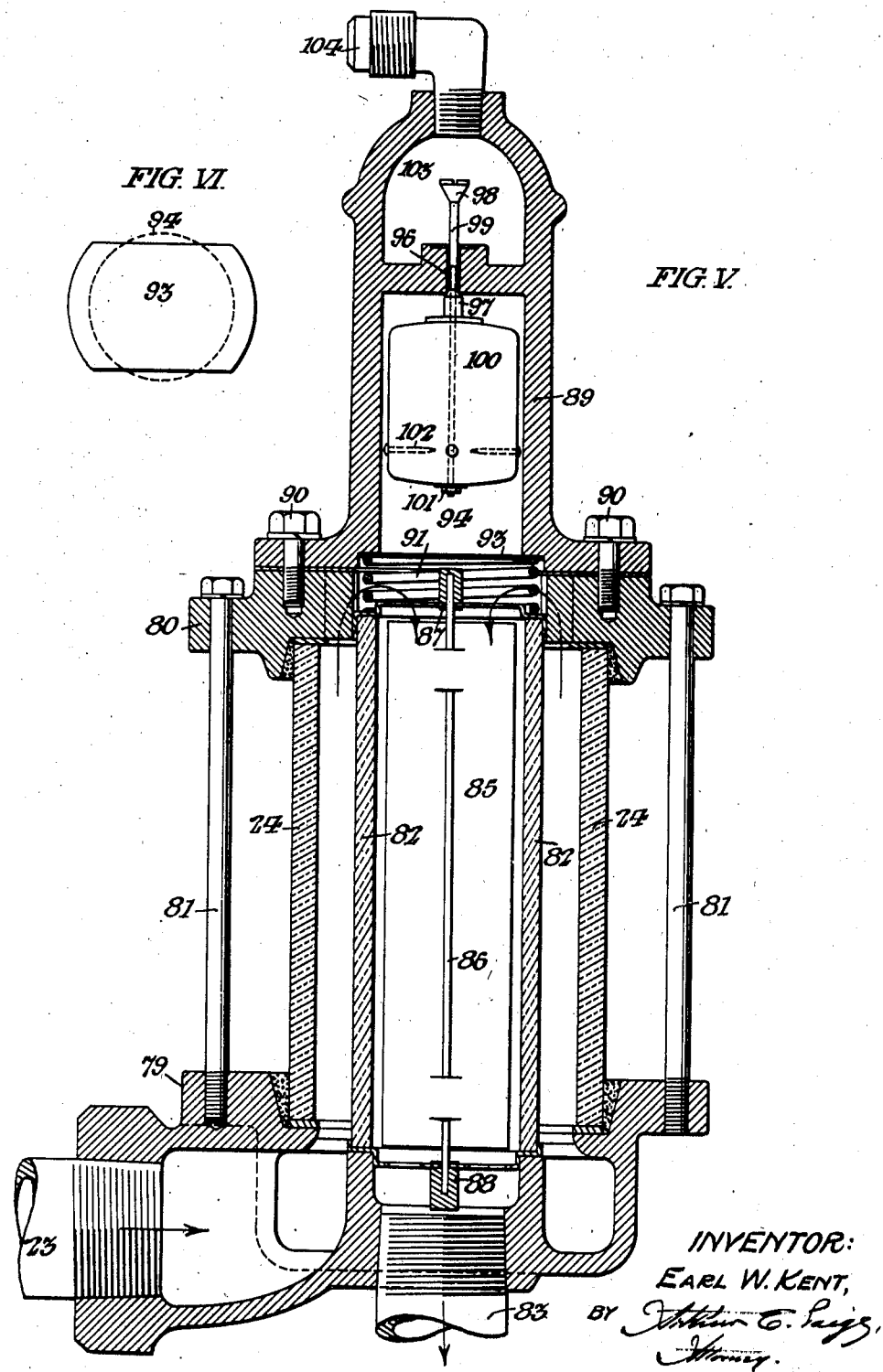

Patented Sept. 27, 1932

1,879,308

UNITED STATES PATENT OFFICE

EARL W. KENT, OF MUSKEGON, MICHIGAN, ASSIGNOR TO SERVICE STATION EQUIPMENT COMPANY, OF CONSHOHOCKEN, PENNSYLVANIA, A CORPORATION OF DELAWARE

LIQUID DISPENSING APPARATUS

Application filed December 4, 1931. Serial No. 578,881.

My invention may be advantageously employed in apparatus for dispensing gasolene by means of a pump which extracts the liquid from a subjacent tank and delivers it under pressure through a flow meter and dispensing hose. Said meter includes a rotatable index pointer adapted to traverse a circular series of graduations on a dial to indicate gallons and fractions thereof dispensed, and said pointer is turned by the flow of fluid through said meter. In some localities the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered thereto and dispensed therethrough. Such means includes what I hereinafter term a gas trap in the liquid supply conduit leading to the meter but located at the top of the apparatus, above the level of the transparent container. Said trap has a return conduit leading back to the suction side of said pump, under control of a valve at said trap, which valve is normally closed, but is opened, momentarily, by any accumulation of liquid in the trap above a predetermined level; so that the surplus liquid in the trap is withdrawn by the suction of the pump whenever said valve is opened.

An adjunctive feature of the form of my invention hereinafter described is a conduit leading from the top of said transparent container into the trap, through which any vapor generated at the top of said container by the exposure of the same to heat of the sun, or otherwise, may escape to the atmosphere, leaving said container fully charged with liquid.

My invention includes the various novel features of construction and arrangement hereinafter more definitely specified.

In said drawings; Fig. I is a partly sectional elevation of liquid dispensing apparatus of the type known as a curb stand, embodying my invention.

Fig. II is a plan view of the dome of said stand shown in Fig. I, but on a larger scale.

Fig. III is a vertical sectional view of said dome shown in Figs. I and II but on a larger scale and embodying the gas trap and its fluid eliminating appurtenances.

Fig. IV is a fragmentary vertical sectional view of said dome taken on the line IV, IV, in Fig. II.

Fig. V is a vertical sectional view of the transparent container and its appurtenances shown in Fig. I, but on a larger scale.

Fig. VI is a plan view of the baffle plate shown in section in Fig. IV.

In said figures, the liquid to be dispensed is stored in an underground tank from which it is withdrawn through the conduit 3 by and to the pump 4 which is conveniently electrically operated by the motor 5 connected therewith by the belt 6. Said pump 4 discharges the liquid through the conduit 8 into the chamber 9 in the trap casing 10 which forms a substantially rectangular dome at the top of the curb stand. Said curb stand includes the substantially rectangular base 12 and center frame 13 connected by the vertical standards 14, surrounded by the removable sheet metal casing 15. Said center frame 13 is connected with said dome 10 by the standards 16, surrounded by the removable sheet metal casing 17.

Said chamber 9 in the trap casing 10 is connected by the conduit 18 with the flow meter 19 which includes mechanism for turning the indicator 20 with respect to graduations on the circular dial 21, to indicate the volume of fluid dispensed through said flow meter from the conduit 18 to the conduit 23. Said conduit 23 leads into the sight gage 24 which is a vessel having a transparent wall through which the quantity of liquid therein may be observed by the purchaser. When the apparatus is working properly, said sight gage 24 is continually filled with liquid which is, however, dispensable therefrom through the flexible hose 25 and nozzle 26 under control of a nozzle valve operable by the lever handle 28 within the handle guard 29 on said nozzle.

As indicated in Fig. I, said nozzle 26 is supported upon the lever 30 which is fulcrumed at 31 in connection with said curb stand and carries at its inner end the rod 32 which is mounted to reciprocate through the platform 33 which is fixed in said stand in connection with the standards 14, and supports the pump 4 and motor 5, as shown. Said rod 32 is arranged to operate an electric switch in the casing 36 provided with the push button 37 projecting downwardly from said casing in cooperative relation with the bracket 38 fixed on said rod 32.

Said pump 4 is conveniently of the type including a rotor 40 having a circular series of spring pressed blades 41, which turn in contact with the cylindrical surface in the casing 42. Said casing 42 incloses the screen chamber 43 containing the removable screen 45 through which the liquid passes from the conduit 3 to the conduit 8.

The construction and arrangement above described are such that all of the fluid lifted by said pump 4, and including liquid, air, and other gaseous vapor, is compelled to pass through said trap chamber 9, and the lighter fluids, of course, separate from the liquid in said chamber.

In order to eliminate the gaseous fluids from said chamber 9 I provide the port 47 in the top of said chamber through which such lighter fluids may escape, under control of a float valve 48 which is pivotally connected with the valve lever 49 fulcrumed at 50 in the stationary bracket 51 in said chamber. Said lever 49 carries at its free end the float 52 by which said lever and the valve 48 are uplifted to close said port 47 whenever the liquid in said chamber reaches a predetermined level, indicated by the dash line 54.

However, I provide said valve port 47 with the by-pass bleed duct 55 through which there is continual communication between said chamber 9 and the chamber 56 which is formed in said dome trap casing 10 above the partition 57. Both said port 47 and by-pass duct 55 are conveniently formed in the top of said bracket 51 which is detachably secured to said partition 57, conveniently by the screws 58.

I find it convenient to provide said port 47 with the upwardly extending jet tube 59; so that any liquid discharged through said port 47 into said chamber 56 is separated from the air or gas in said chamber 56 and gravitates down over said partition 57 into the drain pocket 60. As indicated in Fig. III, the air and other gaseous fluids separated from the liquid in said trap casing 10 escape from the latter through the vent port 61 in the top of said dome 10, which is provided with the cowl 62 permitting the escape of said fluids without ingress of rain or snow.

When the liquid, in said chamber 56, accumulates above the level indicated by the dash line 63, it is drained therefrom back to the suction side of said pump 4 through the conduit 65 shown in Fig. I, under control of the valve 66 which is mounted to reciprocate in the valve casing 67 in registry with the port 68 leading to said conduit 65. Said valve 66 is operatively connected with the lever 70 which is fulcrumed at 71 in said casing 67 and carries at its free end the float 72.

I find it convenient to mount said valve casing 67 and its appurtenances upon the base plate 73 which is rigidly but removably connected with said dome 10 by the cap screws 74 shown in Fig. III. The gasket 75 seals the joint between said dome 10 and plate 73, and the latter is provided with the drain opening 76 normally closed by the removable screw plug 77.

It may be observed that the location of said drain port 68 is such that it is always submerged by liquid in said drain pocket 60, so that it is impossible for the pump to suck air or other gaseous fluid from said chamber 56 when said valve 66 is opened by the rise of liquid in said dome chamber 56.

The apparatus above described is effective to eliminate air and other fluids lighter than the liquid dispensed, from such liquid on its way to the sight gage 24, but, as above contemplated, when said sight gage is exposed to the heat of the sun, in some climates, vapor may be generated from the gasolene therein, and, therefore, I prefer to provide means to vent such vapor from said gage and to maintain the latter always full of liquid by establishing communication between the top of said gage and the chamber 56 in said dome 10. Such means are best shown in Fig. V, wherein the transparent container 24 is a cylinder of glass mounted between the base fitting 79 which is supported by the conduit 23, and the cap fitting 80 which is detachably rigidly connected with said base fitting 79 by the circular series of bolts 81. The liquid passes upwardly from said conduit 23 between said container 24 and the inner glass cylinder 82, over the top of said cylinder 82 and down the latter to the rigid conduit 83 which carries the flexible hose 25. The sheet metal vane 85 is rigidly connected with its axial shaft 86 which is journaled in bearings 87 and 88 respectively at the top and bottom of said cylinder 82; so that said vane is rotated by the swirling movement of the liquid downward through said cylinder 82 to visually manifest the movement of said liquid into the dispensing hose.

I superimpose upon said cap fitting 80 a float valve casing 89, conveniently detachably rigidly connected therewith by the cap screws 90, and arrange said casing 89 to receive and vent to the atmosphere any gaseous fluid which may arise from the liquid in said transparent container. Said vane 85 and its bearings 87 and 88 are conveniently removably held in the assembled relation shown in Fig. V by the spring 91 which is compressed between the circular plate member of said bearing 87 and the bottom of said valve casing 89, and said spring holds in place, against the bottom of said casing 89, the baffle plate 93 which, as shown in Fig. VI, is slightly narrower than the cylindrical chamber 94 in said valve casing 89, so that although said plate 93 baffles the flow of liquid into said valve chamber 94 and compels it to flow downward through said glass cylinder 82, it permits the escape into said chamber 94 of any gaseous fluid arising from the liquid in said transparent container. Said fluid is vented through the valve port 96 in said casing 89, under control of the valves 97 and 98 which are rigidly connected with the valve stem 99, which stem is rigidly connected with the float 100, conveniently by the nut 101. Said float is preferably formed of cork having round headed nails 102 set therein so as to maintain said float in substantially concentric spaced relation in said chamber 94.

The construction and arrangement above described are such that the operation of the pump 4 not only fills the container 24 but also normally fills the valve chamber 94 with the liquid to be dispensed and, when said chamber 94 is substantially filled with liquid, it lifts said float 100 to close said port 96 by the valve 97. However, if and when any fluid lighter than the liquid rises into the top of said chamber 94, the level of the liquid in said chamber is thereby lowered and the float 100 sinks carrying said valve 97 away from said port 96 and opening the latter, thus permitting the lighter fluid to escape through said port 96 and the chamber 103 in said casing 89 and through the conduit 104. Said conduit extends from the top of said valve casing 89 in communication with the chamber 56 in said dome, as indicated in Fig. I, so that the gaseous fluid thus escaping from said float chamber 89 passes through said dome chamber 56 and escapes to the atmosphere through said vent port 61 and cowl 62. While said valve 97 is thus opened, the liquid trapped in said dome chamber 56 is free to gravitate into the float valve chamber 94 at the top of the sight gage, through said gas vent port 96 until said port is closed by either of said valves 97 or 98 carried by said float 100; the purpose and effect of said float valves 97 and 98 and their appurtenances being to not only eliminate any vapor from the liquid which may accumulate in the valve casing 89, but to replace said vapor with liquid from the dome chamber 56 and thus insure that the purchaser receives the full amount of liquid indicated by the meter at each dispensing operation.

As indicated in Figs. I, II, and III, I prefer to provide said dome trap casing 10 with a baffle wall 105 extending upwardly from the bottom of the chamber 9 and with the baffle wall 106 extending downwardly in said chamber from the partition 57, to direct the liquid coming into said chamber 9 from the conduit 8, to the conduit 18 without disturbing the float 52. As indicated in Fig. I, said wall 106 forms a pocket 107 in which gaseous fluid might accumulate unless said pocket is provided with a vent. Therefore, I provide the gas vent tube 109 which, as indicated in Fig. II, is conveniently located in coaxial relation with the outlet conduit 18, but, as shown in Fig. IV, has a screw threaded base 110 which is set in said partition 57. The upper portion of said vent tube 109 projects above the liquid level in said dome chamber 56 so that any gas discharged therefrom escapes through the port 61 in the top of said chamber 56. As shown in Figs. I and III, I find it convenient to provide the lowermost portion of said dome chamber 56 with a drain outlet normally closed by the screw plug 111.

As shown in Figs. I, II, and III, the bottom wall of said dome trap casing 10 is provided with the hand hole 112 to afford convenient access to the valve 48 and its appurtenances, and said hand hole is provided with the removable cover 113 normally rigidly connected with said casing 10 by the series of cap bolts 115; the gasket 116 forming a liquid tight joint between said casing 10 and cover 113.

As shown in Figs. I, II, and III, said dome casing 10 has the upwardly extending flange 117 in concentric relation therewith for supporting the lamp casing 118 which is preferably a globe of translucent glass, which overhangs and shields said vent port 61. Said casing 118 is illuminated by the incandescent electric lamp 119 which is energized by electrical connections extending through the axial tube 120 which is conveniently cast in said casing 10 and in communication with the electric conduit 121 indicated in Fig. I, which carries at its lower end the incandescent lamp 122 adapted to illuminate said dial 21. The conductors for energizing both lamps are conveniently extended through the conduit 123 which, as shown in Fig. I, is connected with the switch casing 36. However, other means may be provided for illuminating a liquid dispensing apparatus embodying my invention.

The essential feature of my invention is the embodiment of a gas trap and eliminator in a structure which also forms the dome at the top of a pump stand and, preferably, forms the base of a lamp for illuminating said stand. However, the broad combination of a gas trap in the top of a sight gage having a vent through a gas chamber at the top of such a dome casing, or otherwise, is the subject matter of my copending application Serial No. 578,882 filed December 4, 1931, for Letters Patent of the United States.

Therefore, I do not desire to limit myself to the specific details of construction and arrangement herein set forth, as it is obvious that various modifications may be made therein without departing from the essential features of my invention, as defined in the appended claims.

I claim:

1. In liquid dispensing apparatus; the combination with a hollow pump stand comprising a base, standards extending upwardly from said base, a hollow dome at the top of said standards having a gas vent to the atmosphere, and a sheet metal casing between said base and dome inclosing said standards; of a pump inclosed by said pump stand having an intake conduit for connection with a subjacent liquid supply tank and a discharge conduit for conducting liquid from said pump into said hollow dome; a liquid drain conduit extending from within the upper portion of said hollow dome back to the suction side of said pump; a float valve controlling said drain conduit; whereby liquid is drained from said dome back to the suction side of said pump by the action of the latter when the liquid in said dome reaches a predetermined level to open said valve; a liquid meter inclosed by said stand; a liquid conduit extending from the bottom of said dome to said meter; and a liquid dispensing conduit from said meter; whereby air and other gaseous fluid is eliminated from said apparatus at said dome.

2. Apparatus as in claim 1; wherein the dome includes a partition separating the upper and lower portions of the interior thereof and having a port for the passage of fluid through said partition and a float valve controlling said port in accordance with the level of the liquid in the lower portion of said dome; whereby gaseous fluid in said dome is separated from the liquid passing therethrough and eliminated to the outer atmosphere.

3. Apparatus as in claim 1; wherein the dome has means for supporting a lamp casing and lamp for illuminating said apparatus; said lamp casing overhanging and shielding the gas vent from said dome; said dome having a tube in integral relation therewith extending vertically therethrough for electrical conductors leading to said lamp from within said stand.

4. In liquid dispensing apparatus; the combination with a hollow pump stand, having a hollow dome at the top thereof, with a gas vent to the atmosphere; of a pump, inclosed by said pump stand, having an intake conduit for connection with a subjacent liquid supply tank, and a discharge conduit for conducting liquid from said pump into said hollow dome; a liquid drain conduit extending from within the upper portion of said hollow dome back to the suction side of said pump; a float valve controlling said drain outlet, whereby liquid is drained from said dome back to the suction side of said pump by the action of the latter when the liquid in said dome reaches a predetermined level to open said valve; a liquid meter inclosed by said stand; a liquid conduit extending from the bottom of said dome to said meter; and a liquid dispensing conduit from said meter; whereby air and other gaseous fluid is eliminated from the liquid to be dispensed, between said pump and said meter, and vented to the atmosphere from said dome.

In testimony whereof, I have hereunto signed my name at Muskegon, Michigan, this thirtieth day of November, 1931.

EARL W. KENT.